(12) United States Patent
Kulkarni et al.

(10) Patent No.: US 10,013,223 B2
(45) Date of Patent: Jul. 3, 2018

(54) METHODS AND SYSTEMS FOR ROUTING AND SCHEDULING PRINT JOBS

(71) Applicant: XEROX CORPORATION, Norwalk, CT (US)

(72) Inventors: Ketki Kulkarni, Bangalore (IN); Pallavi Manohar, Thane (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/848,445

(22) Filed: Sep. 9, 2015

(65) Prior Publication Data
US 2017/0068493 A1    Mar. 9, 2017

(51) Int. Cl.
G06F 3/12      (2006.01)

(52) U.S. Cl.
CPC .......... G06F 3/1287 (2013.01); G06F 3/1211 (2013.01); G06F 3/1262 (2013.01); G06F 3/1288 (2013.01); G06F 2206/1504 (2013.01)

(58) Field of Classification Search
None
See application file for complete search history.

(56) References Cited

U.S. PATENT DOCUMENTS

| | | | |
|---|---|---|---|
| 8,310,700 B2 | 11/2012 | Rai et al. | |
| 2005/0015392 A1* | 1/2005 | Tonkin | G06Q 10/08 |
| 2007/0019228 A1 | 1/2007 | Rai et al. | |
| 2008/0031639 A1* | 2/2008 | Knodt | H04N 1/00233 399/8 |
| 2009/0025002 A1* | 1/2009 | Rai | G06F 3/1217 718/102 |
| 2009/0094087 A1* | 4/2009 | Chung | G06Q 10/063 705/7.11 |
| 2014/0344814 A1* | 11/2014 | Jamjoom | G06F 9/4881 718/101 |

OTHER PUBLICATIONS

Chin-Sheng Chen, Siddharth Mestry, Purushothaman Damodaran, and Chao Wang. The capacity planning problem in make-to-order enterprises. Math. Comput. Model., 50(9-10):1461-1473, Nov. 2009. ISSN 0895-7177. doi: 10.1016/j.mcm.2009.07.010. URL http://dx.doi.org/10.1016/j.mcm.2009.07.010.
U.S. Appl. No. 14/503,990, filed Oct. 1, 2014; Optimal Scheduling of Multi-Site Enterprise Print Jobs; Manohar et al.
(Continued)

Primary Examiner — Lennin Rodriguezgonzale

(57) ABSTRACT

A method and a system are provided for routing a plurality of print jobs and generating a schedule to process the plurality of print jobs. A routing server routes the plurality of print jobs to a plurality of print shops to process the plurality of print jobs within a pre-defined period. The routing server receives a first capacity from each of the plurality of print shops. The routing server routes a first set of print jobs from the plurality of print jobs to the plurality of print shops based on the request and the received first capacity. In an embodiment, a first cost of routing the first set of print jobs is less than a pre-defined first threshold. An application server generates the schedule for processing the first set of print jobs based on one or more second constraints. The first set of jobs are submitted based on the schedule.

26 Claims, 5 Drawing Sheets

(56) References Cited

OTHER PUBLICATIONS

U.S. Appl. No. 14/750,199, filed Jun. 25, 2015; Methods and Systems for Performing Queue-Based Assignment of Print Jobs in a Multi-Site Print Production Environment; Plumettaz et al.

Mircea Ancau. On solving flowshop scheduling problems. In Proceedings of the Romanian Academy, Series A, vol. 13, p. 7179, Jan. 2012.

Andreas Klemmt, Sven Horn, Gerald Weigert, and Klaus-Jürgen Wolter. Simulation-based optimization vs. mathematical programming: A hybrid approach for optimizing scheduling problems. Robotics and Computer-Integrated Manufacturing, 25:917-925, Dec. 2009. ISSN 0736-5845. doi: 10.1016/j.rcim.2009.04.012.

Alan S. Manne. On the job shop scheduling problem. Cowles Foundation Discussion Papers 73, Cowles Foundation for Research in Economics, Yale University, 1959.

Fang Qi Cheng. A bi-objective order allocation optimization model for horizontal manufacturing collaborative alliance. Advanced Materials Research, 102-104(9-10):836-840, 2010.

Pingjuan Huang, Hui Li, and Lidong Han. Order scheduling problems in make-to-order manufacturing systems. In Mechatronics and Automation, 2005 IEEE International Conference, vol. 4, pp. 2179-2184 vol. 4, Jul. 2005. doi: 10.1109/ICMA.2005.1626902.

Hong-guang Bo, Shu-ran Zhang, and Xiao-bing Liu. Research on capacity planning problem in mto enterprises group. In Information Science and Engineering (ICISE), 2010 2nd International Conference on, pp. 473-477, Dec. 2010. doi: 10.1109/ICISE.2010.5691708.

* cited by examiner

METHODS AND SYSTEMS FOR ROUTING AND SCHEDULING PRINT JOBS

TECHNICAL FIELD

The presently disclosed embodiments are related, in general, to printing systems. More particularly, the presently disclosed embodiments are related to methods and systems for routing and scheduling print jobs.

BACKGROUND

In a Make-to-Order (MTO) enterprise environment, jobs, such as print jobs are processed based on an actual requirement received from a user. Typically, in the MTO enterprise environment, such as a print shop enterprise group, a central authority may own and manage facilities at multiple locations. The central authority may receive tasks or jobs. Thereafter, the central authority may route and/or schedule the jobs at the facilities for processing. Such facilities may be located at multiple locations geographically.

Routing of the jobs/tasks across the multiple locations for maximum utilization of resources (at the print shops or facilities) may be achieved within a stipulated time, may be a difficult and a nontrivial task.

Further limitations and disadvantages of conventional and traditional approaches will become apparent to one skill in the art, through comparison of described systems with some aspects of the present disclosure, as set forth in the remainder of the present application and with reference to the drawings.

SUMMARY

According to embodiments illustrated herein, there may be provided a method to generate a schedule to process a first set of print jobs at a print shop. The method may determine one or more second constraints associated with the print shop. In an embodiment, the one or more second constraints may comprise a processing time, being less than an expected time to process the first set of print jobs, a print job from the first set of print jobs may be processed after completion of processing of another print job in the print shop, and a number of print jobs, being processed by a printer from one or more printers at a time instance, may be at most one. In an embodiment, processing of the another print job may precede the processing of the print job. The method may further generate the schedule to process the first set of print jobs based on the one or more second constraints. In an embodiment, the method may minimize the expected time to process the first set of print jobs. The method may further display, on a display screen, a visualization indicative of the schedule of processing the first set of print jobs. The method may further submit the first set of print jobs, at one or more pre-defined time instants, to each of the one or more printers in the print shop. In an embodiment, the one or more pre-defined time instants may be determined based on the generated schedule.

According to embodiments illustrated herein, there may be provided a method to route a plurality of print jobs to a plurality of print shops. The method may receive a request to process the plurality of print jobs within a pre-defined period. In an embodiment, the plurality of print jobs may comprise a first set of print jobs and second set print jobs. The method may receive a first capacity from an application server associated with each of the plurality of print shops. In an embodiment, the first capacity may be deterministic of a number of print jobs that the each of the plurality of print shops can process within a pre-defined period. The method further may route a first set of print jobs to the application server associated with each of the plurality of print shops based on the received request and the received capacity. In an embodiment, the first cost of routing the first set of print jobs to the plurality of print shops is less than a pre-defined first threshold. The method may further receive a feedback from the application server associated with each of the plurality of print shops. In an embodiment, the feedback is indicative of whether each of the plurality of print shops can process the first set of print jobs within the pre-defined period. Based on the received feedback, the method may update the routing of the first set of print jobs. The method may further transmit the first set of print jobs to the application server associated with each of the plurality of print shops based on the updated routing of the first set of print jobs.

According to embodiments illustrated herein, there may be provided an application server that may comprise of one or more processors configured to generate a schedule to process a first set of print jobs at a print shop. The one or more processors may be configured determine one or more second constraints associated with the print shop. The one or more second constraints may comprise a processing time, associated with processing the first set of print jobs, being less than an expected time to process the first set of print jobs, a print job from the first set of print jobs may be processed after completion of processing of another print job in the print shop, and a number of print jobs that may be processed by a printer from one or more printers at a time instance is at most one. The one or more processors may be further configured to generate the schedule to process the first set of print jobs, based on the one or more second constraints. In an embodiment, the one or more second constraints may minimize the expected time to process the first set of print jobs. The one or more processors may be further configured to display on a display screen, a visualization indicative of the schedule of processing the first set of print jobs. The one or more processors may be further configured to submit the first set of print jobs, at one or more pre-defined time instants, to each of the one or more printers in the print shop. In an embodiment, the one or more pre-defined time instants may be determined based on the generated schedule.

According to embodiments illustrated herein, there may be provided a routing server that comprises one or more processors configured to route a plurality of print jobs to a plurality of print shops. The one or more processors may be configured to receive a request to process the plurality of print jobs within a pre-defined period. In an embodiment, the plurality of print jobs comprise a first set of print jobs and second set print jobs. The one or more processors may be further configured to receive a first capacity from an application server associated with each of the plurality of print shops. In an embodiment, the first capacity may be deterministic of a number of print jobs that the each of the plurality of print shops could process within a pre-defined period. The one or more processors may be further configured to route the first set of print jobs from the plurality of print jobs to the application server associated with each of the plurality of print shops based on the received request and the received capacity. In an embodiment, a first cost of routing the first set of print jobs to the plurality of print shops may be less than a pre-defined first threshold. The one or more processors may be further configured to receive a feedback from the application server associated with each of the plurality of print shops. In an embodiment, the feedback may be indicative of whether each of the plurality of print shops can process the first set of print jobs within the pre-defined period. The one or more processors may be further configured to update the routing of the first set of print jobs based on the received feedback. The one or more processors may be further configured to transmit the first set of print jobs to the application server associated with each of the plurality of print shops based on the updated routing of the first set of print jobs.

According to embodiments illustrated herein, a non-transitory computer-readable storage medium having stored thereon, a set of computer-executable instructions for causing a computer comprising one or more processors to perform steps of determining one or more second constraints associated with a print shop. In an embodiment, the one or more second constraints may comprise a processing time, associated with processing a first set of print jobs, a print job from the first set of print jobs is processed after completion of processing of another print job in the print shop, and a number of print jobs, that may be processed by a printer from one or more printers at a time instance is at most one. The one or more processors may further generate a schedule to process the first set of print jobs, based on the one or more second constraints. In an embodiment, the one or more second constraints may minimize the expected time to process the first set of print jobs. The one or more processors may further display on a display screen, a visualization indicative of the schedule of processing the first set of print jobs. The one or more processors may further submit the first set of print jobs, at one or more pre-defined time instants, to each of the one or more printers in the print shop. In an embodiment, the one or more pre-defined time instants may be determined based on the generated schedule.

According to embodiments illustrated herein, a non-transitory computer-readable storage medium having stored thereon, a set of computer-executable instructions for causing a computer comprising one or more processors to perform steps of receiving a request to process a plurality of print jobs within a pre-defined period. In an embodiment, the plurality of print jobs comprise a first set of print jobs and second set print jobs. The one or more processors may further receive a first capacity from an application server associated with each of a plurality of print shops. In an embodiment, the first capacity may be deterministic of a number of print jobs that the each of the plurality of print shops could process within a pre-defined period. The one or more processors may further route a first set of print jobs from the plurality of print jobs to the application server associated with each of the plurality of print shops based on the received request and the received capacity. In an embodiment, a first cost of routing the first set of print jobs to the plurality of print shops may be less than a pre-defined first threshold. The one or more processors may further receive a feedback from each of the plurality of print shops. In an embodiment, the feedback may be indicative of whether each of the plurality of print shops can process the first set of print jobs within the pre-defined period. The one or more processors may be further configured to update the routing of the first set of print jobs based on the received feedback. The one or more processors may be further configured to transmit the first set of print jobs to the application server associated with each of the plurality of print shops based on the updated routing of the first set of print jobs.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Further, the elements may not be drawn to scale.

Various embodiments will hereinafter be described in accordance with the appended drawings, which are provided to illustrate and not to limit the scope in any manner, wherein similar designations denote similar elements, and in which.

DETAILED DESCRIPTION

Figure 1:
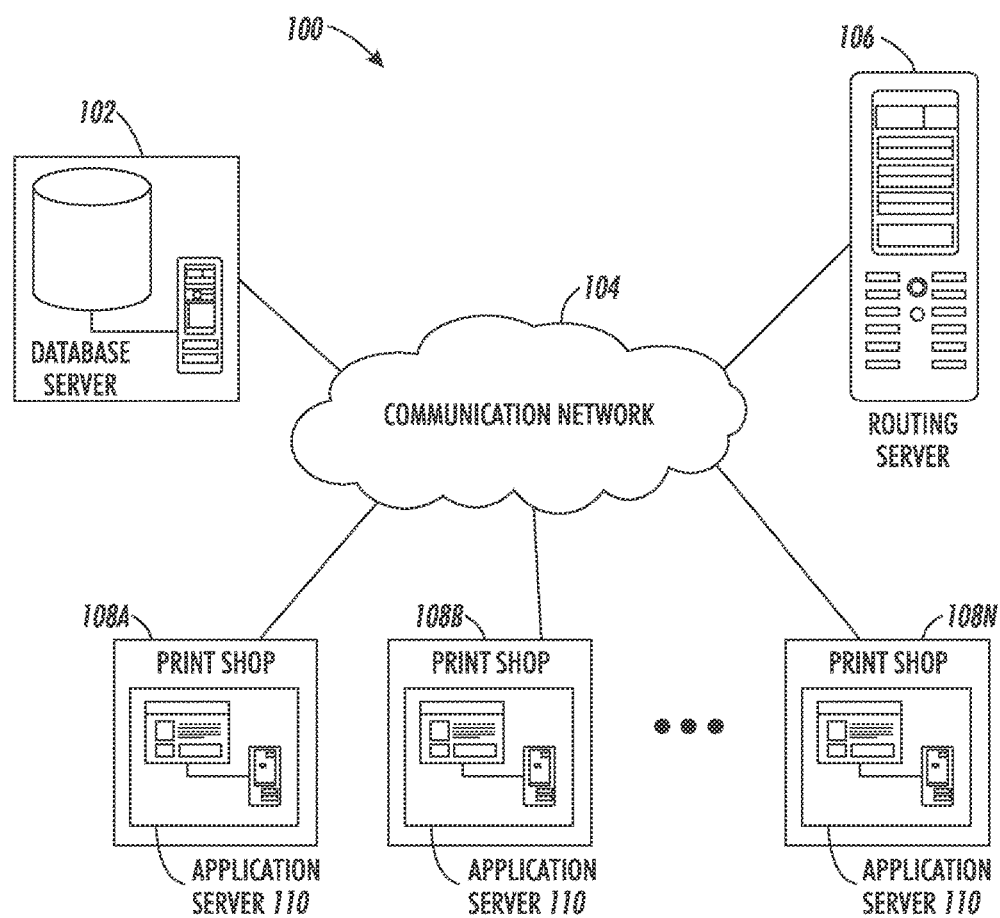
FIG. 1 is a block diagram that illustrates a system environment in which various embodiments of the method and the system may be implemented, in accordance with at least one embodiment.

The present disclosure may be best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Definitions

The following terms shall have, for the purposes of this application, the respective meanings set forth below.

"A geographically distributed print enterprise" represents a Make-to Order (MTO) enterprise environment that implements a pull strategy for processing of plurality of print jobs. The pull strategy corresponds to a processing strategy that processes the plurality of print jobs based on a received request from a user. The geographically distributed print enterprise comprises a routing server and an application server located at each of a plurality of print shops. The routing server routes the plurality of print jobs to each of the plurality of print shops and the application server at each of the plurality of print shops generates a schedule to process the plurality of print jobs routed to each of the plurality of print shops.

A "print shop" refers to a manufacturing entity where a plurality of print jobs are processed. The print shop comprises a plurality of printers utilized to process the plurality of print jobs. To process a print job, the plurality of printers in the print shop processes a plurality of tasks that constitutes each of the plurality of print jobs. In an embodiment, each printer of the plurality of printers may be configured to perform a task different from the tasks processed by other printers at the print shop. In an embodiment, a processing rate of each printer in the plurality of printers may be different. In an embodiment, no two printers in the plurality of printers can perform a same task. In another embodiment, the plurality of tasks associated with the print job cannot be completed on a single printer. Further, the plurality of tasks associated with the print job are performed only at one print shop. Therefore, the plurality of tasks associated with the print job cannot be split across the plurality of print shops.

A "first set of print jobs" refers to a set of print jobs from a plurality of print jobs that have a higher priority as compared to the remaining print jobs from the plurality of print jobs. In an embodiment, there may be a Service Level Agreement (SLA) associated with each print job in the first set of print jobs. Further, the first set of print jobs may be processed in such a manner that an individual capacity utilization associated with each print shop may be maximized within a pre-defined period.

A "Service Level Agreement (SLA)" refers to a set of delivery requirements associated with each print job from a first set of print jobs. In an embodiment, the set of delivery requirements may comprise one or more of, but are not limited to, a quality standard associated with each print job, a tolerance level associated with each print job, a priority level for processing each print job, and the like. The quality standard associated with each print job refers to a type of ink used for printing of each of the plurality of print jobs, a media type (e.g., paper) used for printing of each of the plurality of print jobs. The tolerance level associated with each print job refers to a degree of acceptable deviation with regard to the defined SLA by a user. In an embodiment, the SLA may include a pre-defined period within which the plurality of print jobs needs to be processed.

A "second set of print jobs" refer to a set of print jobs from the plurality of print jobs that have less priority in comparison to a first set of print jobs. Further, there may be no Service Level Agreement (SLA) associated with the second set print jobs. In an embodiment, the second set of print jobs may be processed to increase the utilization of the print shops.

A "first capacity" refers to a number of print jobs that a print shop can process within a pre-defined period. In an embodiment, the first capacity associated with the print shop may be determined based on a number of printers at the print shop and a processing rate associated with each printer present at the print shop.

A "second capacity" refers to a number of print jobs that a print shop can process in addition to processing of a first set of print jobs.

A "feedback" refers to a notification that may be transmitted by an application server (installed at a print shop) to a routing server. The feedback may be indicative of whether each of the plurality of print shops can process the first set of print jobs within the pre-defined period.

An "updated first capacity" refers to a capacity of a print shop that may be determined in response to transmission of the feedback to the routing server by the application server at the print shop. The updated first capacity refers a number of print jobs that the print shop can process within a remaining time of the pre-defined period. In an embodiment, the updated first capacity may be determined based on the remaining time, the number of printers at the print shop, and the processing rate associated with each printer present at the print shop.

A "processing time" refers to a time required for processing the plurality of print jobs. In an embodiment, the processing time corresponds to a difference between a timestamp when processing of a first print job started and a timestamp at which the processing of a last print job stopped. In an embodiment, the processing time of a first set of print jobs is determined based on a measure of a processing rate of the one or more printers and a start time of processing of the first set of print jobs.

"One or more first constraints" refer to one or more parameters based on which a routing server may be configured to route a plurality of print jobs to a plurality of print shops. In an embodiment, the one or more first constraints may comprise one or more of, but are not limited to, a minimization of a first cost, a distance between the print job and the print shop, an adherence to the first capacity, a second cost, and a third cost. In an embodiment, the first cost may refer to a cost of routing a first set of print jobs to the plurality of print shops. In an embodiment, the second cost may refer to a cost of transportation of a print job to a print shop. In an embodiment, the third cost may refer to a cost of processing the print job on a printer at the print shop.

"One or more second constraints" refer to one or more parameters based on which an application server at a print shop may be configured to generate a schedule for processing a plurality of print jobs assigned to the print shop. In an embodiment, the one or more second constraints may comprise one or more of, but are not limited to, a processing time that may be less than an expected time to process a first set of print jobs, a processing of a print job from the first set of print jobs after processing of another print job in the print shop, and a number of print jobs processed by a printer from one or more printers at a time instance may be at most one.

"Schedule" may refer to a plan to process a set of tasks using one or more devices. In an embodiment, the schedule may include information pertaining to time instants at which processing of a task from the set of tasks needs to be started. Further, the schedule may include the information pertaining to a device from the one or more device that may process the task. In an embodiment, the task may correspond to a print job that may be processed on a printer installed in a print shop. The schedule generated in such a scenario may include information pertaining to one or more time instants at which the processing of the print job may start at the printer.

"Predefined period" refers to a time duration within which a first set of print jobs may be processed by one or more printers at a print shop. In an embodiment, apart from processing the first set of print jobs, one or more second print jobs may be processed by the one or more printers at the print shop.

"Visualization" refers to a diagrammatic representation of a schedule that may be utilized to process a first set of print jobs and one or more second print jobs. In an embodiment, the visualization may correspond to a Gantt chart that illustrates a start time of processing each print job from the first set of print jobs. Further, the visualization may represent a time-line that represents processing time required for processing the first set of print jobs. Further, in an embodiment, the visualization may represent a time instant at which a printer from one or more printers at a print shop may start processing a print job form the first set of print jobs and one or more second print jobs.

"Processing rate" refers to a number of print jobs that a printer from one or more printers within a print shop may process within a pre-defined period. In an embodiment, the processing rate associated with each of the one or more printers may be uniform. In an embodiment, the processing rate associated with each of the one or more printers may be variable.

FIG. 1 is a block diagram that illustrates a system environment 100 in which various embodiments of the method and the system may be implemented. In an embodiment, the system environment 100 corresponds to a geographically distributed print enterprise. The system environment 100 includes a database server 102, a communication network 104, a routing server 106, and a plurality of print shops, such as 108a, 108b, . . . , and 108n, located at a plurality of geographically distributed locations. Further, each of the plurality of print shops may include an application server 110. The database server 102, the routing server 106, and the application server 110 (from each of the plurality of print shops) are communicatively coupled to each other via communication network 104. In an embodiment, the application server 110 communicates with the database server 102 and the routing server 106 using one or more protocols such as, but not limited to, Open Database Connectivity (ODBC) protocol and Java Database Connectivity (JDBC) protocol.

In an embodiment, the database server 102 may refer to a computing device that may be configured to store a plurality of print jobs in a buffer. The database server 102 may be further configured to transmit the plurality of print jobs to the routing server 106. In an embodiment, the plurality of print jobs may comprise of a first set of print jobs and/or second set print jobs. In an embodiment, the database server 102 may include a special purpose operating system specifically configured to perform one or more database operations on the plurality of print jobs. Examples of the one or more database operations may include, but are not limited to, Select, Insert, Update, and Delete. In an embodiment, the database server 102 may include hardware and/or software that may be configured to perform the one or more database operations. In an embodiment, the database server 102 may be realized through various technologies such as, but not limited to, Microsoft® SQL Server, Oracle®, IBM DB2®, Microsoft Access®, PostgreSQL®, MySQL® and SQLite®, and the like.

In an embodiment, the communication network 104 corresponds to a communication medium through which the database server 102, the routing server 106, and the application server 110, may communicate with each other. Such a communication may be performed, in accordance with various wired and wireless communication protocols. Examples of such wired and wireless communication protocols include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, 2G, 3G, 4G cellular communication protocols, and/or Bluetooth (BT) communication protocols. The communication network 104 includes, but is not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN).

In an embodiment, the routing server 106 may refer to a computing device that may be configured to route the plurality of print jobs to each of the plurality of print shops, such as 108a, 108b, . . . , and 108n. In an embodiment, the routing server 106 may include a special purpose operating system specifically configured to perform one or more routing operations on the plurality of print jobs. The special purpose operating system may include one or more processors and one or more memories. The one or more memories may include computer readable code that may be executable by the one or more processors to perform one or more routing operations. Examples of the one or more routing operations may comprise, but are not limited to, determining a best path to transmit the plurality of print jobs to the plurality of print shops, maintaining a routing table of the plurality of print jobs, and load sharing operations. In an embodiment, the routing table may refer to a data structure comprising a list of a plurality of routes stored in the routing server 106. In an embodiment, the routing table may contain information about the topology of the communication network 104. In an embodiment, the best path corresponds to a shortest path to transmit the plurality of print jobs to the plurality of print shops. In an embodiment, the best path may be determined using one or more state of the art algorithms, such as Dijkstra's algorithm, Bellman-Ford algorithm, and the like. In an embodiment, the routing server 106 may include hardware and/or software that may be configured to perform the one or more routing operations. In an embodiment, the routing server 106 may utilize one or more protocols such as, Border Gateway Protocol (BGP) to transmit the plurality of print jobs to the application server 110 at each of the plurality of print shops.

In an embodiment, the routing server 106 may be configured to receive a request to process the plurality of print jobs. After receiving the request, the routing server 106 may be configured to receive a first capacity from each of the plurality of print shops. After receiving the first capacity from each of the plurality of print shops, the routing server 106 may be configured to transmit a first set of print jobs to each of the plurality of print shops based on one or more first constraints. In an embodiment, the routing server 106 may be configured to receive a feedback, from each of the plurality of print shops indicative of whether each of the plurality of print shops can process the first set of print jobs within a pre-defined period. In an embodiment, the routing server 106 may be further configured to receive/determine an updated first capacity associated with each of the plurality of print shops based on the received feedback. Further, the routing server 106 may be configured to reroute one or more print jobs to other print shops based on the received feedback and/or the updated first capacity. In an embodiment, the one or more print jobs correspond to print jobs that cannot be processed by a print shop. The one or more print jobs can be determined based on the received feedback.

A person with ordinary skills in the art will understand that the scope of the disclosure is not limited to the database server 102 as a separate entity. In an embodiment, the functionalities of the database server 102 may be integrated into the routing server 106, or vice-versa.

In an embodiment, the application server 110 refers to a computing device or a software framework hosting an application or a software service. In an embodiment, the application server 110 may be installed in each of the plurality of print shops. In another embodiment, the each of the plurality of print shops may be connected to the application server 110 over the communication network 104. In an embodiment, the application server 110 may be implemented to execute procedures such as, but not limited to, programs, routines, or scripts stored in one or more memories for supporting the hosted application or the software service. In an embodiment, the hosted application or the software service may be configured to perform one or more predetermined operations. In an embodiment, the one or more predetermined operations may comprise at least scheduling the first set of print jobs on a plurality of printers in the print shops. The application server 110 may be realized through various types of application servers such as, but not limited to, a Java application server, a .NET framework application server, a Base4 application server, a PHP framework application server, or any other application server framework. The operation of the application server 110 has been described later in conjunction with FIG. 2.

In an embodiment, the application server 110 at each of the print shops may be configured to transmit the first capacity to the routing server 106. The first capacity may be indicative of a number of print jobs that the respective print shops can process within the pre-defined period. Based on the transmitted first capacity, the application server 110 may be configured to receive the request for processing the first set of print jobs. The application server 110 may be further configured to determine one or more second constraints associated with the print shop. The determination of the one or more second constraints has been explained later in conjunction with FIG. 3.

Based on the determined one or more second constraints, the application server 110 is further configured to generate the schedule to process the first set of print jobs. In an embodiment, the application server 110 may be configured to implement a Mixed Integer Programming (MIP) technique on the one or more second constraints to generate the schedule. In an embodiment, the application server 110 may be further configured to display a visualization, on the display screen, indicative of the schedule of processing the first set of print jobs. In an embodiment, the visualization may correspond to a graphical visualization, such as a Gantt chart.

Figure 2:
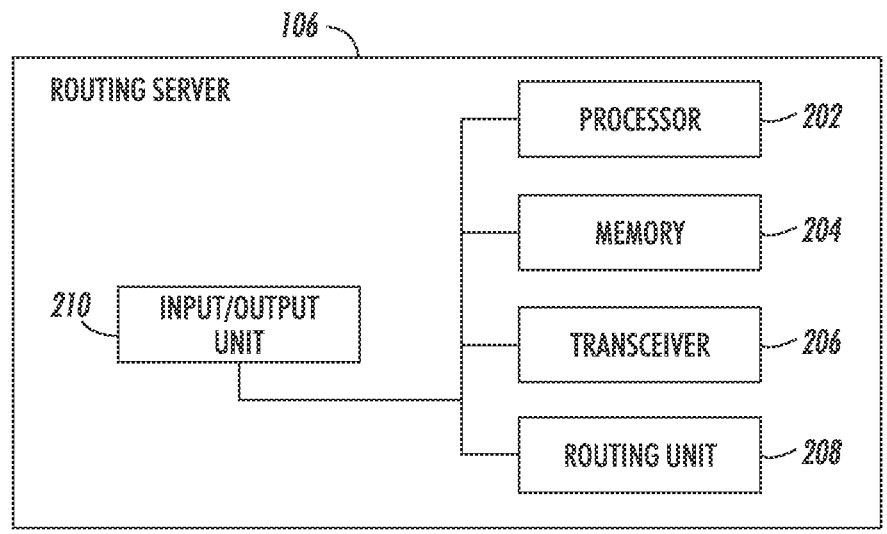
FIG. 2 is a block diagram that illustrates a routing server configured to route a plurality of print jobs to a plurality of print shops, in accordance with at least one embodiment.

FIG. 2 is a block diagram that illustrates the routing server 106 configured to route the plurality of print jobs to the plurality of print shops, in accordance with at least one embodiment. FIG. 2 is explained in conjunction with elements from FIG. 1. In an embodiment, the routing server 106 includes a processor 202, a memory 204, a transceiver 206, a routing unit 208, and an input/output unit 210. The processor 202 may be communicatively connected to the memory 204, the transceiver 206, the routing unit 208, and the input/output unit 210. The transceiver 206 may be communicatively coupled to the communication network 104.

The processor 202 comprises suitable logic, circuitry, interfaces, and/or code that may be configured to execute a set of instructions stored in the memory 204. The processor 202 may be implemented based on a number of processor technologies known in the art. The processor 202 works in conjunction with the routing unit 208 to route the plurality of print jobs to the application server 110 at each of the plurality of print shops. Examples of the processor 202 include, but are not limited to, an X86-based processor, a Reduced Instruction Set Computing (RISC) processor, an Application Specific Integrated Circuit (ASIC) processor, a Complex Instruction Set Computing (CISC) processor, and/or other processor.

The memory 204 comprises suitable logic, circuitry, interfaces, and/or code that may be configured to store the set of instructions, which are executed by the processor 202. In an embodiment, the memory 204 may be configured to store one or more programs, routines, or scripts that are executed by the processor 202 in conjunction with the routing unit 208. In an embodiment, one or more routing algorithms may be stored in the memory 204. The memory 204 may be implemented based on a Random Access Memory (RAM), a Read-Only Memory (ROM), a Hard Disk Drive (HDD), a storage server, and/or a Secure Digital (SD) card.

The transceiver 206 comprises suitable logic, circuitry, interfaces, and/or code that may be configured to receive the plurality of print jobs from the database server 102, via the communication network 104. The transceiver 206 implements one or more known technologies to support wired or wireless communication with the communication network 104. In an embodiment, the transceiver 206 includes, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 206 communicates via wireless communication with networks, such as the Internet, an Intranet and/or a wireless network, such as a cellular telephone network, a wireless local area network (LAN) and/or a metropolitan area network (MAN). The wireless communication uses any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The routing unit 208 comprises suitable logic, circuitry, interfaces, and/or code that may be configured to implement one or more routing algorithms to route the first set of print jobs to the application server 110 at each of the plurality of print shops. In an embodiment, the routing unit 208 may be configured to implement the MIP technique for routing the plurality of print jobs. In an embodiment, the routing of the plurality of print jobs to the application server 110 at each of the print shops may be performed in such a manner that a first cost of routing the first set of print jobs may be less than a pre-defined first threshold. In an embodiment, the routing unit 208 may be configured to implement the one or more routing algorithms which may be developed using one or more programming languages such as, C, C++, COBOL, Java, and the like. In another embodiment, the routing unit 208 may be implemented as an Application-Specific Integrated Circuit (ASIC) microchip designed for a special application, such as a particular kind of routing protocol utilized to route the first set of print jobs to the application server 110 at each of the plurality of print shops.

The input/output unit 210 comprises suitable logic, circuitry, interfaces, and/or code that may be configured to receive an input or provide an output to a user. In an embodiment, the user may correspond to a requestor who may have requested to process the plurality of print jobs. The input/output unit 210 comprises various input and output devices that are configured to communicate with the processor 202. Examples of the input devices include, but are not limited to, a keyboard, a mouse, a joystick, a touch screen, a microphone, a camera, and/or a docking station. Examples of the output devices include, but are not limited to, a display screen and/or a speaker.

In operation, the processor 202 may receive a request to process the plurality of print jobs within the pre-defined period from the user. In another embodiment, the processor 202 may receive the request to process the plurality of print jobs from one or more requestor-computing devices (not shown). The one or more requestors may utilize the one or more requestor-computing devices to transmit the request associated with the plurality of print jobs. In an embodiment, the plurality of print jobs may comprise a first set of print jobs and second set print jobs. In response to the received request, the processor 202 may transmit a message to the application server 110 at each of the plurality of print shops. In an embodiment, the message may include a request to share the first capacity associated with each of the plurality of print shops. In response to the transmitted message, the processor 202 may receive the first capacity of each of the plurality of print shops from the respective application server 110. Further, the routing unit 208 may determine a second cost corresponding to a cost of transportation of a print job j to a print shop l. Additionally, the processor 202 may receive a third cost corresponding to a cost of processing the print job on a printer i at the print shop l from respective application server 110. Based on the second cost and the third cost, the routing unit 208 may determine the first cost. In an embodiment, the first cost may be determined by computing a sum of the second cost and the third cost.

Thereafter, the routing unit 208 may be configured to determine the one or more first constraints. In an embodiment, the one or more first constraints may comprise one or more of, but are not limited to, a minimization of the first cost, a distance between a print job (at the database server 102) and a print shop, an adherence to the first capacity, the second cost, and the third cost. In an embodiment, the routing unit 208 may determine the point of origination of the request for processing the print job and may further determine the distance between the print job and the print shop to which the print job is routed. Let the distance between the print job j and the print shop l, be denoted by $d_{jl}$. Let the second cost corresponding to a cost of transportation of the print job j to the print shop l be denoted by $ĉ_{jl}$. Let the third cost corresponding to a cost of processing the print job on the printer i at the print shop l be denoted by cp. In an embodiment, the application server 110 may determine the capacity associated with each printer from the plurality of printers at each of the plurality of print shops. The processor 202 may receive the capacity of each print shop from the respective application server 110. Let the capacity of printer i at the print shop l be denoted by $R_{il}$. Let a fraction of the sum of first capacities received from each of the print shops be denoted by f. Each fraction of the sum of first capacities refers to the capacity of each printer at the print shop. Based on the determined capacity of each printer at each print shop, the routing server 106 may be configured to receive the first capacity associated with each print shop.

In an embodiment, the one or more first constraints may be represented in accordance with the equation 1 and equation 2.

$$\Sigma_{l=0}^{L} x_{jl} = 1, j = 1, \ldots, J \qquad (1)$$

$$\Sigma_j x_{jl} * p_{ijl} \leq f * R_{il}, i=1, \ldots, I; l=1, \ldots, L \qquad (2)$$

The variable $x_{jl}$ corresponds to a decision variable that has a binary value (1 or 0) associated with the variable. In an embodiment, the routing unit 208 utilizes the decision variable to determine whether the print job j may be assigned to the print shop l. In an embodiment, if the value assigned to the decision variable by the routing unit 208 is 1 then it signifies that the print job j may be assigned to the print shop l. In an embodiment, if the value assigned to the decision variable by the routing unit 208 is 0 then it signifies that the print job j may be not assigned to the print shop l. The equation 1 ensures that each print job may be assigned each print shop for processing and the each print job may be assigned to at most one print shop. The equation 2 provides a capacity restriction associated with each printer at each print shop.

A person skilled in the art will understand that the scope of the disclosure should not be limited to determining the one or more first constraints based on the aforementioned factors and using the aforementioned techniques. Further, the examples provided in supra are for illustrative purposes and should not be construed to limit the scope of the disclosure.

The variable $p_{ijl}$ in equation 2 corresponds to the processing time of the print job j in the printer i at the print shop l. In an embodiment, $p_{ijl}$ may be determined in accordance with equation 3.

$$p_{ijl} = \frac{JS_j}{PR_{il}}, j = 1, \ldots, J; i = 1, \ldots, I; l = 1, \ldots, L \qquad (3)$$

where, $JS_j$: denotes a print job size of print job j; and $PR_{il}$: denotes a processing rate of printer i at print shop l.

A person skilled in the art will understand that the scope of the disclosure should not be limited to determining the processing time of the print job based on the aforementioned factors and using the aforementioned techniques. Further, the examples provided in supra are for illustrative purposes and should not be construed to limit the scope of the disclosure.

In an embodiment, the routing unit 208 may identify the first set of jobs from the plurality of print jobs based on the MIP technique. Based on the determined one or more first constraints, the routing unit 208 may be configured to implement one or more routing algorithms, stored in the memory 204, to route the first set of print jobs to the application server 110 at each of the plurality of print shops. In an embodiment, the routing unit 208 may be configured to utilize the MIP technique on the one or more first constraints for routing the plurality of print jobs to the plurality of print shops. In an embodiment, the routing unit 208 may route the first set of jobs in such a manner that the routing unit 208 adheres with the first capacity of each of the print shops. In an embodiment, the routing of the plurality of print jobs to the application server 110 at each of the plurality of print shops may be performed in such a manner that the first cost of routing the first set of print jobs may be less than the pre-defined first threshold.

In order to route the first set of jobs to the plurality of print shops, a simulation technique such as an MIP technique is implemented on the one or more first constraints. In an embodiment, the MIP technique for routing the first set of print jobs to the print shop 1 may be implemented by the routing unit 208 in accordance with equation 4. In an embodiment, the routing unit 208 may be configured to implement the equation 4 to minimize the first cost where the first cost may correspond to the sum of the second cost and third cost for the first set of print jobs across the plurality of printers at the plurality of print shops.

$$\min \Sigma_i \Sigma_j \Sigma_l x_{jl} * p_{jl} * c_{ijl} + \Sigma_i x_{jl} * d_{jl} * \hat{c}_{ijl}$$

subject to $\Sigma_{l=0}^{L} x_{jl} = 1, j = 1, \ldots, J$ $$\Sigma_j x_{jl} * p_{ijl} \leq f * R_{il}, i=1, \ldots, l; l=1, \ldots, L \quad (4)$$

A person skilled in the art will understand that the scope of the disclosure should not be limited to routing the first set of print jobs based on the aforementioned factors and using the aforementioned techniques. Further, the examples provided in supra are for illustrative purposes and should not be construed to limit the scope of the disclosure.

In an embodiment, after routing the first set of print jobs to each of the plurality of print shops, the routing unit 208 may be configured to receive a feedback, from the application server 110 at each of the plurality of print shops. The feedback may be indicative of whether each of the plurality of print shops can process the first set of print jobs within the pre-defined period. In an embodiment, the feedback may include the information about the print jobs from the first set of print jobs that each of the plurality of print shops cannot process. In an embodiment, the information may state the reason for the feedback. Examples of the reason for feedback may comprise a low processing rate of the printer, an unavailability of a printer, and the like. Further, the feedback may include the number of first print jobs that each print shop cannot process. In response to the received feedback, the routing unit 208 may further receive the updated first capacity from the application server 110 at each of the plurality of print shops. In another embodiment, the routing unit 208 may determine the updated first capacity based on the received feedback. In such a scenario, the routing unit 208 may determine the updated first capacity based on the information provided in the feedback. For example, the feedback provides information that a processing rate of three printers at the print shop has decreased to one print job per minute from three jobs per minute. The routing unit 208 may determine the updated capacity of the print shop based on the updated processing rate of three printers at the print shop.

Based on the updated first capacity, the routing unit 208 may be configured to reroute a subset of first set of print jobs from the first set of print jobs to another print shop. In an embodiment, the subset of the print jobs correspond to the print jobs that cannot be processed by the print shop. The routing unit 208 may be configured to implement the MIP technique to route the first set of print jobs and the subset of first set of print jobs based on the feedback until no feedback may be received from any of the print shop from the plurality of print shops.

After routing of the first set of print jobs and the subset of first set of print jobs, the routing unit 208 may be further configured to receive a second capacity associated with each of the plurality of print shops based on a count of the first set of print jobs routed to each of the plurality of print shops. Let the second capacity be denoted by $R'_{il}$. In an embodiment, the second capacity may be indicative of a count of the second set of print jobs that each print shop may process in addition to the first set of print jobs. Based on the received second capacity, the routing unit 208 may be further configured to route the second set of print jobs to each of the plurality of print shops using the MIP technique based on the second capacity of each of the plurality of print shops. In an embodiment, the routing unit 208 may be further configured to route the second set of print jobs to each of the plurality of print shops in accordance with equation 5 such that a maximum number of print jobs are accepted by the plurality of print shops.

$$\max \Sigma_i \Sigma_j y_{jl} \quad (5)$$

subject to $\Sigma_{l=0}^{L} y_{il} \leq 1, j=1, \ldots, J \quad (6)$ $$\Sigma_j y_{jl} * p_{ijl} \leq R'_{il}, i=1, \ldots, l; l=1, \ldots, L \quad (7)$$

The variable $R'_{il}$ corresponds to the second capacity of the printer i at the print shop 1. The variable $y_{jl}$ represents a decision variable utilized to determine whether the print job routed to the print shop 1 may be accepted or rejected by the application server 110 of the print shop 1. In an embodiment, the value assigned to variable $R'_{il}$ is determined by the application server 110 based on the second capacity associated with the print shop 1. In an embodiment, if the value assigned to variable $R'_{il}$ by the routing unit 208 is 1 then it signifies that the print job j may be accepted by the print shop 1. In an embodiment, if the value assigned to variable $R'_{il}$ by the routing unit 208 is 0 then it signifies that the print job j may be rejected by the print shop 1. The equation 6 ensures that each print job, which is accepted may be processed by at most one print shop and does not require the plurality of print shops for processing the print job. The equation 7 ensures that the processing requirements of the second set of print jobs that are accepted are within the first capacity associated with each of the plurality of print shops.

In accordance with equation 5, a number of the second set of print jobs that may be processed at the plurality of print shops are determined. Based on the determined number of second set of print jobs, the routing unit 208 may be further configured to route the second set of print jobs to the plurality of print shops based on the MIP technique.

A person skilled in the art will understand that the scope of the disclosure should not be limited to routing the second set of print jobs to each of the plurality of print shops based on the aforementioned factors and using the aforementioned techniques. Further, the examples provided in supra are for illustrative purposes and should not be construed to limit the scope of the disclosure.

In an embodiment, the routing unit 208 may determine a route of the first set of print jobs to the application server 110 associated with each of the plurality of print shops. Further, in an embodiment, the routing unit 208 may receive the feedback from the application server 110 associated with each of the plurality of the print shops. The feedback may be indicative of whether the one or more printers at the print shop from the plurality of print shops can process the first set of print jobs. Based on the received feedback, the routing unit 208 may update the route of the first set of print jobs. Subsequently, the transceiver 206 may transmit the first set of print jobs to the application server 110 associated with each print shop from the plurality of print shops based on the updated routing of the first set of print jobs.

In an example scenario, consider a geographically distributed print enterprise with a central facility with the routing server 106 and four print shops such as, a print shop-1, a print shop-2, a print shop-3, and a print shop-4. Each of the four print shops comprises four printers. Consider a request is received for processing 10 print jobs with a defined SLA to process each of the print job in three minutes. Based on the received request, the routing server 106 receives the first capacity from each of the four print shops. The first capacity transmitted by the print shop-1, the print shop-2, the print shop-3, and the print shop-4 are five print jobs, three print jobs, two print jobs, and three print jobs respectively. The first capacity corresponds to a number of print jobs a print shop can process within three minutes. The routing server 106 determines the distance between the routing server 106 and each of four print shops. Further, the routing server 106 determines the second cost and the third cost. The routing server 106 further determines the first cost based on the second cost and the third cost. The routing of the 10 print jobs across the four print shops is performed in accordance with equation 1. The routing is performed such that the routed jobs to each of the four print shops adhere to the transmitted first capacity and minimize the first cost. In the scenario described herein, the routing server 106 routes five print jobs to the print shop-1, three print jobs to the print shop-2, one print job to the print shop-3, and one print job to the print shop-4.

However, after the routing is completed, the print shop-1 provides a feedback that the print shop-1 can process only three print jobs in three minutes. Based on the received feedback, the routing server 106 routes two print jobs out of five print jobs routed to print shop-1 to the print shop-4. Thus, the print shop-4 now has three print jobs to process. After 10 print jobs having the SLA of three minutes are routed, the routing server 106 may receive a second capacity from each of the four print shops. The print shop-3 transmits the second capacity indicating that the print shop-3 can process one print job apart from the print job having the SLA. Based on the received second capacity, the routing server 106 routes one print job having no SLA to the print shop-3. Thus, as explained in the example scenario, the routed print jobs adhere to the transmitted first capacity, minimize the first cost, and maximize the capacity utilization of the geographically distributed print enterprise.

In an implementation scenario, let the plurality of print shops comprise of one or more homogenous printers. The one or more homogenous printers at each of the print shops may refer to the printers that have uniform processing rates at each of the print shops. Thus, the plurality of print shops may be identical and a deciding criteria for selection of the print shop may be based on the distance that the print job needs to travel from the database server 102 to a particular print shop. In an embodiment, the distance between a print shop 1 and the database server 102 is minimum followed by the distance of a print shop 2, the distance of a print shop 3, the distance of a print shop 4, and the distance of a print shop 5. In an embodiment, capacity constraints are lower upper bounds, that is, each print shop has the capacity to process the plurality of P print jobs. Further, in an embodiment, it may not be mandatory that each print shop may be assigned at least one print job. Thus, in an embodiment, a print shop may not be assigned a print job.

In such an implementation scenario, consider that there are L print shops and there P first set of print jobs that are to be routed to the L print shops that contain M printers. Consider a request is received from the database server 102 to process a first set of print jobs in 45 minutes. Table 1 shown below illustrates the input parameters for routing and generating the schedule for the P first set of print jobs.

TABLE 1

| Input Parameter | Notation | Value |
| --- | --- | --- |
| First Set of Print Jobs | P | 13 |
| Printers | M | 4 |
| Print Shops | L | 5 |

In response to the received request from the database server 102 to process a first set of print jobs in 45 minutes, the routing server 106 receives the first capacity of each print shop. Table 2 shown below illustrates the capacity of each of the printers at each of the print shops.

TABLE 2

| Print shop | Capacity of Printer 1 | Capacity of Printer 2 | Capacity of Printer 3 | Capacity of Printer 4 |
| --- | --- | --- | --- | --- |
| Print shop 1 | 200 | 200 | 200 | 200 |
| Print shop 2 | 200 | 200 | 200 | 200 |
| Print shop 3 | 200 | 200 | 200 | 200 |
| Print shop 4 | 150 | 150 | 150 | 150 |
| Print shop 5 | 200 | 200 | 200 | 200 |

In accordance with Table 2, the first capacity of the print shop 1, print shop 2, print shop 4, and print shop 5 is 800 print jobs, whereas the first capacity of the print shop 3 is 600 print jobs. Based on the received first capacities from each print shop, the routing server 106 routes the 13 first set of jobs across the 5 print shops by applying the MIP technique. The MIP technique routes the 13 first set of print jobs across the 5 print shops such that the sum of processing time of the 13 first set of print jobs and the transport time of the 13 first set of print jobs is minimum. Table 3 shown below illustrates the routing performed by the routing server 106 in accordance with the equation 1.

TABLE 3

| Print Shop | Number of first set of print jobs assigned | Processing time (minutes) |
| --- | --- | --- |
| Print shop 0 | 3 | 38 |
| Print shop 1 | 3 | 40 |
| Print shop 2 | 3 | 37 |
| Print shop 3 | 2 | 30 |
| Print shop 4 | 2 | 29 |

As shown in Table 3, the print shop 0 is assigned 3 print jobs, such as print job 1, print job 2, and print job 3 and the processing time is 38 minutes. The print shop 1 is assigned 3 print jobs, such as print job 4, print job 5, and print job 6 and the processing time is 40 minutes. The print shop 2 is assigned 3 print jobs, such as print job 7, print job 8, and print job 9 and the processing time is 37 minutes. The print shop 3 is assigned 2 print jobs, such as print job 10, and print job 11 and the processing time is 30 minutes. The print shop 4 is assigned 2 print jobs, such as print job 12, and print job 13 and the processing time is 29 minutes.

After routing of the 13 first set of print jobs is completed, at each print shop, the application server 110 generates the schedule for processing the print jobs assigned to each of the print shops. In an embodiment, the application server 110 generates the schedule by applying the MIP technique. The application server 110 further generates a visualization of the schedule generated at each print shop. The visualization of the generated schedule at the print shop has been explained later in conjunction with FIG. 4.

A person skilled in the art will understand that the example of performing routing of plurality of print jobs and generating a schedule for the plurality of print jobs has been provided for illustrative purposes and should not be construed to limit the scope of the disclosure.

Figure 3:
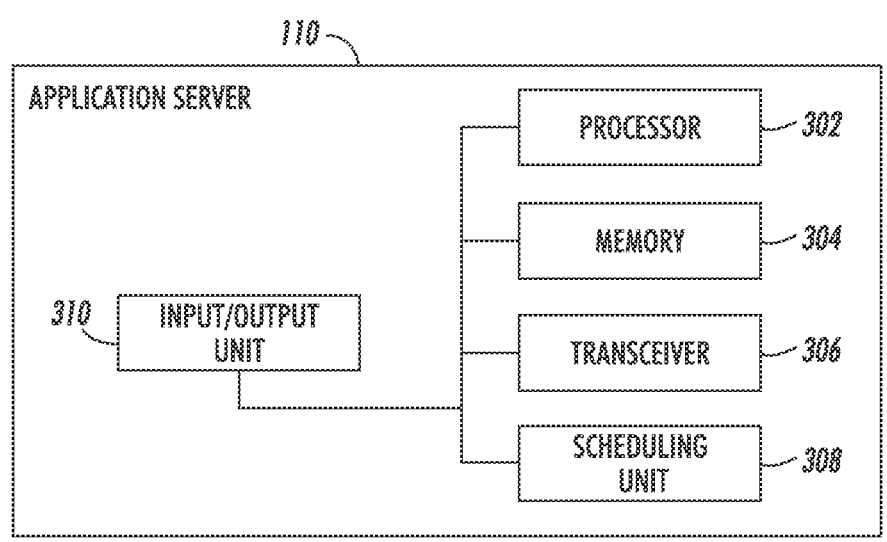
FIG. 3 is a block diagram that illustrates an application server configured to generate a schedule to process a first set of print jobs at a print shop, in accordance with at least one embodiment.

FIG. 3 is a block diagram that illustrates an application server 110 configured to generate a schedule to process the first set of print jobs at a print shop, in accordance with at least one embodiment. FIG. 3 is explained in conjunction with elements from FIG. 1 and FIG. 2.

In an embodiment, the application server 110 includes a processor 302, a memory 304, a transceiver 306, a scheduling unit 308, and an input/output unit 310. The processor 302 may be communicatively connected to the memory 304, the transceiver 306, the scheduling unit 308, and the input/output unit 310. The transceiver 306 may be communicatively coupled to the communication network 104.

The processor 302 comprises suitable logic, circuitry, interfaces, and/or code that may be configured to execute a set of instructions stored in the memory 304. The processor 302 may be implemented based on a number of processor technologies known in the art. The processor 302 works in conjunction with the scheduling unit 308 to generate the schedule to process the first set of print jobs at the print shop. Examples of the processor 302 include, but are not limited to, an X86-based processor, a Reduced Instruction Set Computing (RISC) processor, an Application-Specific Integrated Circuit (ASIC) processor, a Complex Instruction Set Computing (CISC) processor, and/or other processor.

The memory 304 comprises suitable logic, circuitry, interfaces, and/or code that may be configured to store the set of instructions, which are executed by the processor 202. In an embodiment, the memory 304 may be configured to store one or more programs, routines, or scripts that are executed by the processor 202 in conjunction with the scheduling unit 308. The memory 304 may be implemented based on a Random Access Memory (RAM), a Read-Only Memory (ROM), a Hard Disk Drive (HDD), a storage server, and/or a Secure Digital (SD) card.

The transceiver 306 comprises suitable logic, circuitry, interfaces, and/or code that may be configured to receive the first set of print jobs and/or second set of print jobs from the routing server 106, via the communication network 104. The transceiver 306 implements one or more known technologies to support wired or wireless communication with the communication network 104. In an embodiment, the transceiver 306 includes, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 306 communicates via wireless communication with networks, such as the Internet, an Intranet and/or a wireless network, such as a cellular telephone network, a wireless local area network (LAN) and/or a metropolitan area network (MAN). The wireless communication uses any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The scheduling unit 308 comprises suitable logic, circuitry, interfaces, and/or code that may be configured to generate the schedule for processing the first set of print jobs and the second set of print jobs by applying the Mixed Integer Programming (MIP) technique on the one or more second constraints. In an embodiment, the schedule may be generated such that the expected time to process the first set of print jobs and the second set of print jobs may be minimum. The scheduling unit 308 may be further configured to determine the one or more second constraints associated with the print shop. In an embodiment, the one or more second constraints comprise the processing time associated with the processing of the first set of print jobs, a print job from the first set of print jobs may be processed after completion of processing of another print job in the print shop, and a number of print jobs being processed by a printer from one or more printers at a time instance may be at most one. The scheduling unit 308 may be further configured to display, on a display screen, a visualization indicative of the schedule of processing the first set of print jobs and the second set of print jobs.

The input/output unit 310 comprises suitable logic, circuitry, interfaces, and/or code that may be configured to receive an input or provide an output to a user. The input/output unit 310 comprises various input and output devices that are configured to communicate with the processor 302. Examples of the input devices include, but are not limited to, a keyboard, a mouse, a joystick, a touch screen, a microphone, a camera, and/or a docking station. Examples of the output devices include, but are not limited to, a display screen and/or a speaker.

In operation, the processor 302 may receive the message from the routing server 106. In an embodiment, the message includes the request to share the first capacity associated with the print shop. In response to the received message, the processor 302 transmits the first capacity associated with the print shop. In response to the transmitted first capacity, the processor 302 may receive the request to process the first set of print jobs within the pre-defined period from the routing server 106. In an embodiment, the scheduling unit 308 may be configured to implement one or more scheduling algorithms, stored in the memory 204, to generate the schedule for processing the first set of print jobs at the print shop.

In order to generate the schedule, the scheduling unit 308 may be configured to determine the one or more second constraints. In order to determine the one or more second constraints, the scheduling unit 308 may determine a processing time of the print job i at a printer k be denoted by $p_{ik}$. Further, the scheduling unit 308 may be configured to determine the sum of the processing time of the first set of print jobs (denoted by K). In addition, the scheduling unit 308 may be utilized to determine if the print job i requires a printer k for task l. In an embodiment, if the value assigned to variable $r_{ijk}$ by the scheduling unit 308 is 1 then it signifies that the print job j requires the printer k for the task l. In an embodiment, if the value assigned to variable $r_{ijk}$ by the scheduling unit 308 is 0 then it signifies that the print job j may not require the printer k for the task l. Let $C_{max}$ correspond to the processing time for processing the first set of print jobs.

In an embodiment, the scheduling unit 308 may be configured to utilize decision variables such as $s_{ik}$ and $x_{ijk}$ for scheduling the first set of print jobs. The decision variable $s_{ik}$ may correspond to a start time of the print job i at the printer k. The decision variable $x_{ijk}$ may be utilized by the scheduling unit 308 to determine whether a print job precedes another print job in the first set of print jobs. In an embodiment, if the value assigned to variable $x_{ijk}$ by the scheduling unit 308 is 1 then it signifies that the print job j precedes the print job i. In an embodiment, if the value assigned to variable $x_{ijk}$ by the scheduling unit 308 is 0 then it signifies that the print job j does not precede the print job i.

The following equations signify the one or more second constraints:

$$\min\{C_{max}\|\min C_{max}+\delta^*\Sigma_{i,j}s_{i,j}\} \quad (8)$$

$$\text{subject to } \Sigma_{k=1}^{m}r_{imk}(s_{ik}+p_{ik}){\leq}C_{max}, i=1,\ldots,n \quad (9)$$

$$\Sigma_{k=1}^{m}r_{ilk}(s_{ik}+p_{ik})-\Sigma_{k=1}^{m}r_{i,l+1,k}s_{ik}{\leq}0, i=1,\ldots m; l=1,\ldots m-1 \quad (10)$$

$$K(1-x_{ijk})+s_{jk}-s_{ik}{\geq}p_{ik}, k=1,\ldots,m; 1{\leq}i<j{\leq}n \quad (11)$$

$$Kx_{ijk}+s_{ik}-s_{jk}{\geq}p_{jk}, k=1,\ldots,m; 1{\leq}i<j{\leq}n \quad (12)$$

$$\Sigma_{k=1}^{m}r_{imk}(s_{ik}+p_{ik}){\leq}z_i, i=1,\ldots,n \quad (13)$$

$$\Sigma_{k=1}^{m}r_{imk}(s_{ik}+p_{ik}){\leq}\Sigma_{k=1}^{m}q_k^*r_{imk}, i=1,\ldots,n \quad (14)$$

The equation 8 represents two possible choices for the objective of generating the schedule based on the one or more second constraints. The objective of the first term in equation 8 is to minimize the processing time and the objective of the second term is to start each print job as early as possible while trying to minimize the processing time. The term $z_i$ corresponds to the due date of job i. The term $q_i$ represents the capacity of printer i. The term δ is a controlling parameter that decides the weight assigned to the capacity function. In an embodiment, if the value of δ is chosen as a large number then the scheduling is performed such that priority is given to reduce idling times and starting print jobs as early as possible. The equation 9 provides the lower bound for $C_{max}$ in equation 8.

The equation 10 ensures that the starting time of the print job i with the task l+1 may be not earlier than its finish time in the predecessor task l. The equations 11 and 12 ensures that only one print job may be processed on a printer at any given timestamp. The equation 13 ensures that the print jobs adhere to the deadlines. The equation 14 restricts the last task of each print job to finish within the capacity of the printer on which the print job is scheduled.

In an embodiment, the scheduling unit 308 may be configured to implement the MIP technique for generating the schedule to process the first set of print jobs. In an embodiment, the schedule of the first set of print jobs may be generated in such a manner that the expected time to process the first set of print jobs ($C_{max}$) may be minimized in accordance with equation 8.

A person skilled in the art will understand that the scope of the disclosure should not be limited to generating the schedule for processing the first set of print jobs based on the aforementioned factors and using the aforementioned techniques. Further, the examples provided in supra are for illustrative purposes and should not be construed to limit the scope of the disclosure.

In response to the generation of the schedule to process the first set of print jobs, the input/output unit 310 may be configured to display the visualization of the generated schedule on the display screen. In an embodiment, the visualization may correspond to a graphical visualization, such as the Gantt chart. The graphical visualization of the generated schedule is explained later in conjunction with FIG. 4.

Further, in an embodiment, the scheduling unit 308 may be configured to determine the second capacity associated with the print shop. In an embodiment, the second capacity may be determined in accordance with equation 5, equation 6, and equation 7. The second capacity may correspond to the number of print jobs that the print shop can process apart from the first set of print jobs having the SLA associated with each of the print jobs. The scheduling unit 308 may transmit the second capacity associated with the print shop to the routing server 106. Based on the transmitted second capacity, the processor 302 may be configured to receive the one or more second jobs for processing at the print shop. For example, if a print shop transmits a second capacity indicating that the print shop can process three print jobs apart from six print jobs with a pre-defined SLA, then the routing server 106 may transmit up to three print jobs that may not have a pre-defined SLA. The processor 302 may further determine the schedule to process the one or more second jobs at the print shop. The graphical visualization of the generated schedule of the one or more second print jobs is explained later in conjunction with FIG. 4. After determining the schedule to process the first set of print jobs and the one or more second print jobs, the processor 302 may submit the first set of print jobs and the one or more second print jobs at one or more pre-defined time instants, to each of the one or more printers in the print shop. In an embodiment, the one or more pre-defined time instants may be determined based on the generated schedule. For example, the generated schedule for processing the first set of print jobs comprises the start time associated with each print job from the first set of print jobs. In an embodiment, the start time associated with each print job from the first set of print jobs corresponds to the one or more pre-defined time instants at which the processor 302 may submit the print job from the first set of print jobs to the one or more printers in the print shop for processing.

In another embodiment, the application server 110 at each of the plurality of print shops may transmit the feedback to the routing server 106. The feedback may be indicative of whether each of the plurality of print shops can process the first set of print jobs within the pre-defined period. In an embodiment, a print shop may not be able to process the first set of print jobs within the pre-defined period because of a low processing rate of the printers at the print shop, unavailability of one or more printers, and the like. For example, if at a print shop, when a first capacity was transmitted, four printers were in operational state and after the transmitted first capacity, one of four printers at the print shop faced a technical problem. Thus, the first capacity of the print shop has reduced and the print shop transmits the feedback to the routing server 106. The feedback mentions that the first capacity of the print shop has reduced and the print shop will not be able to process the first set of print jobs routed to the print shop within the pre-defined period. Based on the provided feedback, one or more print jobs routed to the print shop may be rerouted to another print shop.

Figure 4:
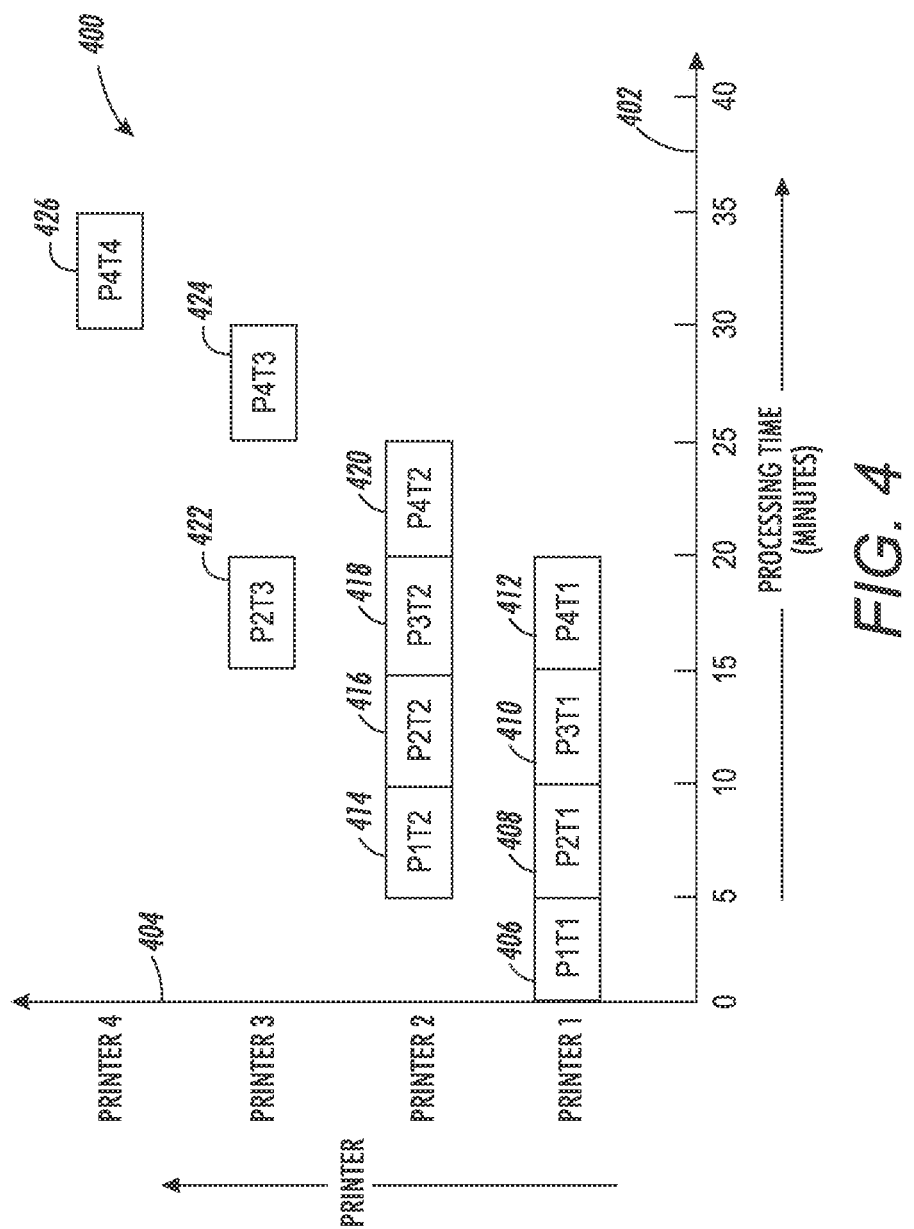
FIG. 4 illustrates a visualization 400 of the schedule generated to process the first set of print jobs and the second set of print jobs at a print shop, in accordance with at least one embodiment.

FIG. 4 illustrates a visualization 400 of the schedule generated to process the first set of print jobs and the second set of print jobs at a print shop, in accordance with at least one embodiment. FIG. 4 is explained in conjunction with elements from FIG. 1, FIG. 2, and FIG. 3.

Consider a print shop 1 with four printers (printer 1, printer 2, printer 3, and printer 4) each having a processing rate of 7 minutes/per task. In an embodiment, each printer is configured to perform only one task. For example, as shown in the Table 4 below, the printer 1 is configured to perform task 1 (T1), the printer 2 is configured to perform task 2 (T2), the printer 3 is configured to perform task 3 (T3), and the printer 4 is configured to perform task 4 (T4). In an embodiment, each of the printer may perform the task associated with the plurality of jobs. For example, the printer 1 can perform the task 1 associated with a print job 1, a print job 2, a print job 3, and a print job 4.

TABLE 4

| Printer Name | Task Performed by Printer |
|---|---|
| Printer 1 | Task 1 (T1) |
| Printer 2 | Task 2 (T2) |
| Printer 3 | Task 3 (T3) |
| Printer 4 | Task 4 (T4) |

In an embodiment, the application server 110 at the print shop 1 receives a message, from the routing server 106, indicative of transmitting the first capacity of the print shop 1 to the routing server 106. Let the SLA defined by the routing server 106 to process the first set of print jobs based on the first capacity be 35 minutes. In response to the received message, the application server 110 at the print shop 1 transmits the first capacity indicating that the print shop can process five print jobs within the defined SLA.

Based on the transmitted first capacity, the print shop 1 may receive five print jobs to process at the print shop on the four printers. However, the print shop 1 transmits a feedback to the routing server 106 indicating that the processing rate of each of the printers at the print shop has decreased to 5 minutes/per task and thus the updated first capacity is three print jobs. Based on the updated first capacity (three print jobs), the print shop is assigned three print jobs (first set of print jobs) such as, Print job 1 (PJ1), Print job 2 (PJ2), Print job 3 (PJ3). Each print job comprises one or more tasks that need to be processed by the one or more printers at the print shop. Table 5 shown below illustrates the number of tasks associated with each print job. Each task associated with each print job is denoted as $P_xT_y$, where P represents a print job, x represents a number of the print job, T represents a task associated with the print, and y represents a number of the task associated with the print job. For example, $P_1T_1$ denotes task 1 of print job 1. Similarly, $P_1T_2$ denotes task 2 associated with print job 2.

TABLE 5

| Print Job | Number of tasks |
|---|---|
| Print job 1 | 2 ($P_1T_1$, $P_1T_2$) |
| Print job 2 | 3 ($P_2T_1$, $P_2T_2$, $P_2T_3$) |
| Print job 3 | 2 ($P_3T_1$, $P_3T_2$) |

After the three print jobs are received, the application server 110 at the print shop may transmit the second capacity indicating that the print shop can process one more additional print job apart from the received three print jobs. Based on the transmitted second capacity, the print shop may receive a print job 4 (PJ4). In an embodiment, the print job 4 may not have an associated SLA and may refer to the second set of print jobs. The print job 4 may comprise four tasks.

Based on the received print jobs (PJ1, PJ2, PJ3, and PJ4), the application server 110 at the print shop may generate the schedule to process the four print jobs at the 4 printers in the print shop 1. FIG. 4 illustrates the visualization 400 of the schedule generated to process the print jobs (PJ1, PJ2, PJ3, and PJ4), at the print shop. The visualization 400 refers to a Gantt chart indicating the schedule associated with each printer at the print shop. With reference to FIG. 4, an X-axis referenced by 402 displays the time required for processing each task associated with each print job. A Y-axis referenced by 402 indicates the printers (printer 1, printer 2, printer 3, and printer 4) at the print shop 1. Further, 406, 408, 410, and 412 indicate the schedule of printer 1 at the print shop 1. 406 refers to the processing time associated with the task 1 of the print job 1. 408 refers to the processing time associated with the task 1 of the print job 2. 410 refers to the processing time associated with the task 1 of the print job 3. 412 refers to the processing time associated with the task 1 of the print job 4. In an embodiment, the application server 110 may submit the task 1 of print job 1 to printer 1 at the 0-th time instant. Further, after processing the task 1 of print job 1 at printer 1, the application server 110 may submit the task 1 of print job 2 after 5 minutes of submitting the task 1 of print job 1 to printer 1. Similarly, the application server 110 may submit the task 1 of print job 3 after 10 minutes of submitting the task 1 of print job 1 to printer 1.

A person skilled in the art will understand that submission of the task associated with the print job at the printer at a particular time instant as described herein is for illustrative purposes and should not be construed to limit the scope of the disclosure.

Further, 414, 416, 418, and 420 indicate the schedule of printer 2 at the print shop 1. 414 refers to the processing time associated with the task 2 of the print job 1. 416 refers to the processing time associated with the task 2 of the print job 2. 418 refers to the processing time associated with the task 2 of the print job 3. 420 refers to the processing time associated with the task 2 of the print job 4.

Further, 422, 424 indicate the schedule of printer 3 at the print shop 1. 422 refers to the processing time associated with the task 3 of the print job 2. 424 refers to the processing time associated with the task 3 of the print job 4. Further, 426 indicates the schedule of printer 4 at the print shop 1. 426 refers to the processing time associated with the task 4 of the print 4.

A person skilled in the art will understand that the visualization 400 of the schedule generated for processing the first set of print jobs and the second set of print jobs at a print shop as shown in FIG. 4 is for illustrative purposes and should not be construed to limit the scope of the disclosure.

A person skilled in the art will understand that the plurality of printers in the print shop may have a same processing rate or a variable processing rate and the generated schedule for processing the first set of print jobs and the second set of print jobs at a print shop as shown in FIG. 4 is for illustrative purposes and should not be construed to limit the scope of the disclosure.

Figure 5:
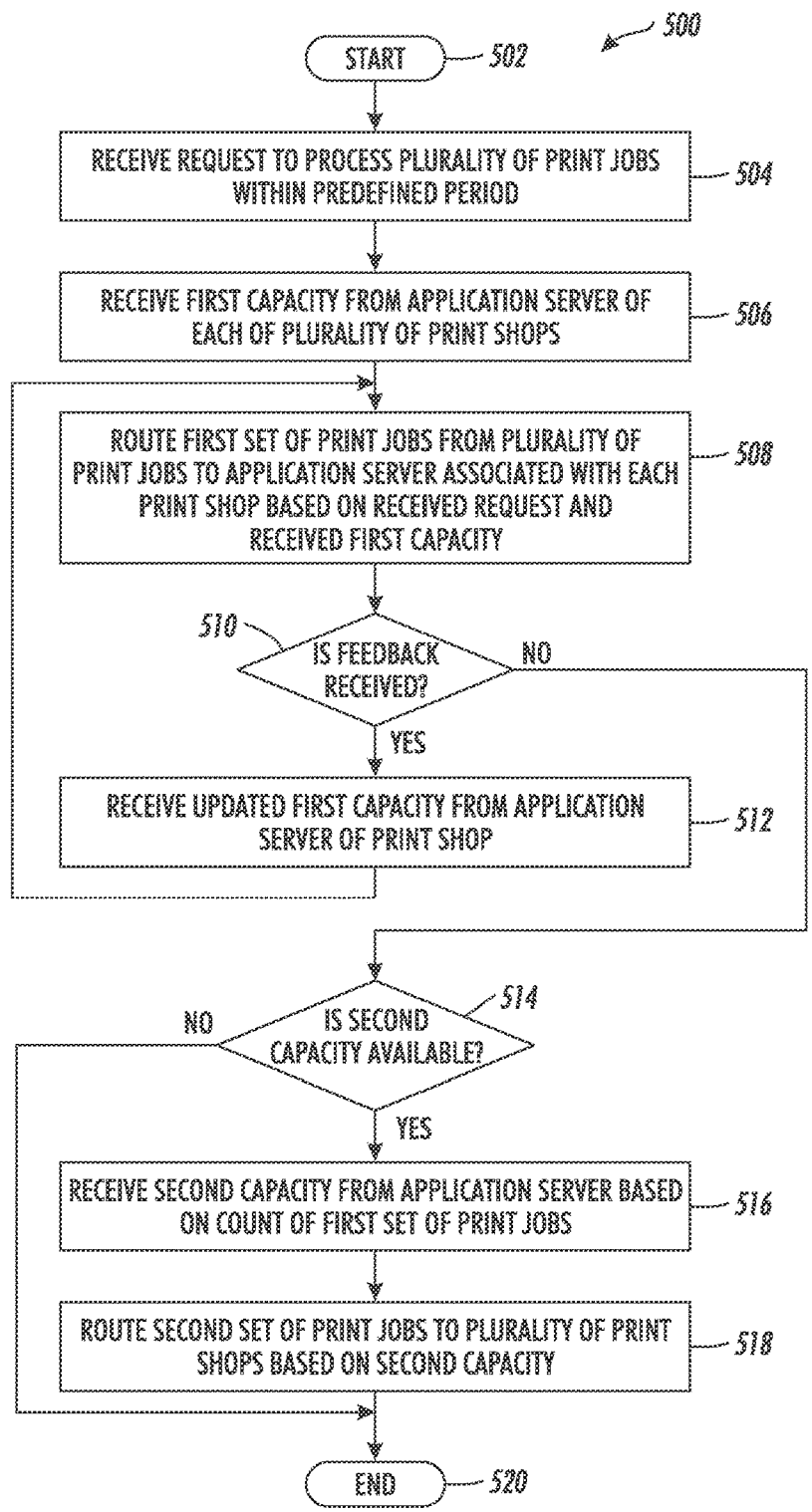
FIG. 5 illustrates a flowchart illustrating a method to route a plurality of print jobs to a plurality of print shops, in accordance with at least one embodiment.

FIG. 5 illustrates a flowchart 500 illustrating a method to route the plurality of print jobs to the plurality of print shops, in accordance with at least one embodiment. The flowchart 500 is described in conjunction with FIG. 1, FIG. 2, and FIG. 3. The method starts at step 502 and proceeds to step 504. At step 504, the routing server 106 may receive the request to process the plurality of print jobs within the pre-defined period. At step 506, the routing server 106 may receive the first capacity from each of the plurality of print shops. At step 508, the routing server 106 may route the first set of print jobs from the plurality of print jobs to each of the plurality of print shops based on the received request and the received first capacity and the by applying a MIP technique. At step 510, the routing server 106 may check whether a feedback is received. If a feedback is received then the method proceeds to step 512 else the method proceeds to step 514. At step 512, the routing server 106 may receive the updated first capacity from one or more of the plurality of print shops that may have provided the feedback. After step 512, the method proceeds to step 508.

At step 514, the routing server 106 may determine if the second capacity may be available. If the second capacity is available, the method proceeds to 516, else the method proceeds to end step 520. At step 516, the routing server 106 may receive the second capacity from each of the print shops based on the count of first set of print jobs routed to each of the print shops. At step 518, the routing server 106 may route the second set of print jobs to each of the print shops based on the received second capacity. Control passes to end step 520.

Figure 6:
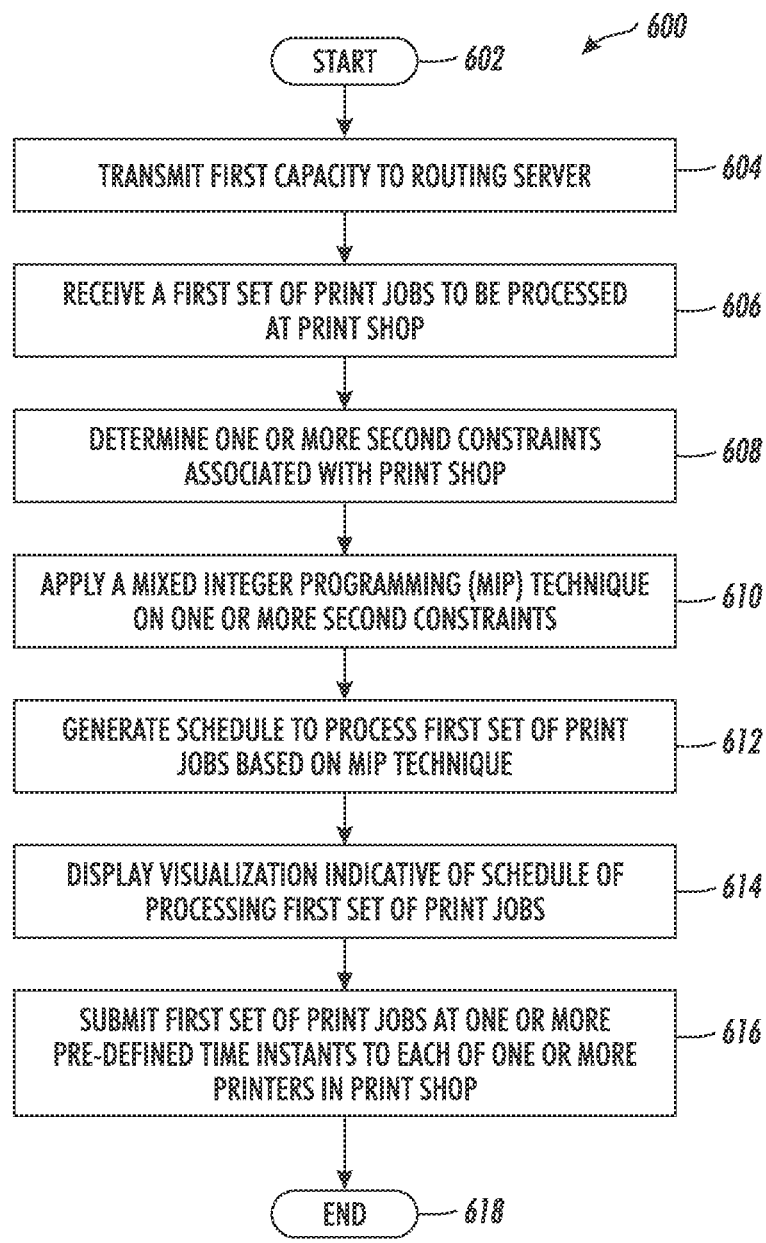
FIG. 6 illustrates a flowchart illustrating a method to generate a schedule to process a first set of print jobs at a print shop, in accordance with at least one embodiment.

FIG. 6 illustrates a flowchart 600 illustrating a method to generate the schedule to process the first set of print jobs at the print shop, in accordance with at least one embodiment. The flowchart 600 is described in conjunction with FIG. 1, FIG. 2, and FIG. 3. The method starts at step 602 and proceeds to step 604. At step 604, the application server 110 may transmit a first capacity to the routing server 106. In response to the transmitted first capacity, at step 606, the application server 110 may receive the first set of print jobs to be processed at the print shop. At step 608, the application server 110 may determine the one or more second constraints associated with the print shop. In an embodiment, the one or more second constraints may comprise the processing time associated with processing the first set of print jobs, a print job from the first set of print jobs may be processed after completion of processing of another print job in the print shop, and a number of print jobs being processed by a printer from one or more printers at a time instance may be at most one.

In response to determination of the one or more second constraints, at step 610, the application server 110 may apply the MIP technique on the one or more second constraints. At step 612, the application server 110 may generate the schedule to process the first set of print jobs at the print shop. At step 614, the application server 110 may display the visualization indicative of the schedule of processing the first set of print jobs. At step 616, the application server 110 may submit the first set of print jobs at one or more pre-defined time instants to each of the one or more printers in the print shop. In an embodiment, the one or more pre-defined time instants are determined based on the generated schedule. Control passes to end step 618.

In an embodiment, the disclosed method and system for routing a plurality of print jobs and generating a schedule for processing the plurality of print jobs may be implemented in a geographically distributed manufacturing enterprise. In an embodiment, the geographically distributed manufacturing enterprise may comprise of a central authority and a plurality of manufacturing entities distributed across a plurality of location. Further, each of the plurality of manufacturing entities may comprise of a plurality of machines configured to process the plurality of print jobs. In an embodiment, the disclosed method and system may be implemented in such a manner that the capacity utilization of the geographically distributed manufacturing enterprise may be maximized.

Various embodiments of the disclosure provide a non-transitory computer readable medium and/or storage medium, and/or a non-transitory machine-readable medium and/or storage medium having stored thereon, a machine code and/or a computer program having at least one code section executable by a machine and/or a computer to generate a schedule to process a first set of print jobs at a print shop. The at least one code section in an application server 110 causes the machine and/or computer to perform the steps, which comprises of determining one or more second constraints associated with a print shop. In an embodiment, the one or more second constraints may comprise a processing time, associated with processing a first set of print jobs, being less than an expected time to process the first set of print jobs, a print job from the first set of print jobs may be processed after completion of processing of another print job in the print shop, and a number of print jobs, being processed by a printer from one or more printers at a time instance, may be at most one, wherein the print shops owns the one or more printers. In an embodiment, the processing of the another print job precedes processing of the print job. The one or more processors are further configured to generate a schedule to process the first set of print jobs, by applying a Mixed Integer Programming (MIP) technique on the one or more second constraints, wherein the MIP minimizes the expected time to process the first set of print jobs. The one or more processors are further configured to display, on a display screen, a visualization indicative of the schedule of processing the first set of print jobs. The one or more processors may further configured to submit the first set of print jobs, at one or more pre-defined time instants, to each of the one or more printers in the print shop. In an embodiment, the one or more pre-defined time instants may be determined based on the generated schedule.

Various embodiments of the disclosure provide a non-transitory computer readable medium and/or storage medium, and/or a non-transitory machine-readable medium and/or storage medium having stored thereon, a machine code and/or a computer program having at least one code section executable by a machine and/or a computer to route a plurality of print jobs to a plurality of print shops. The at least one code section in an application server 110 causes the machine and/or computer to perform the steps, which comprises receiving a request to process a plurality of print jobs within a pre-defined period. In an embodiment, the plurality of print jobs comprise a first set of print jobs and second set print jobs. The one or more processors may further receive a first capacity indicative from each of a plurality of print shops. In an embodiment, the first capacity may be deterministic of a number of print jobs that the each of the plurality of print shops could process within a pre-defined period. The one or more processors may further route a first set of print jobs from the plurality of print jobs to the plurality of print shops by applying a Mixed Integer Programming (MIP) technique based on the received request and the received capacity. In an embodiment, a first cost of routing the first set of print jobs to the plurality of print shops may be less than a pre-defined first threshold. The one or more processors may further receive a feedback indicative of whether each of the plurality of print shops can process the first set of print jobs within the pre-defined period. The one or more processors may further receive an updated first capacity based on the received feedback. In an embodiment, a schedule may be generated for processing of the first set of print jobs by each of the plurality of print shops. In an embodiment, the schedule generation comprises determination of one or more second constraints associated with a print shop. In an embodiment, the one or more second constraints comprise a processing time, associated with processing the first set of print jobs, being less than an expected time to process the first set of print jobs, a print job from the first set of print jobs may be processed after completion of processing of another print job in the print shop, and a number of print jobs, being processed by a printer from one or more printers at a time instance, may be at most one, wherein the print shop owns the one or more printers. In an embodiment, processing of the another print job precedes the processing of the print job. The one or more processors may be further configured to transmit the first set of print jobs to the application server associated with each of the plurality of print shops based on the updated routing of the first set of print jobs.

Various embodiments of the disclosure encompass numerous advantages including methods and systems for routing and scheduling a plurality of print jobs in a Make-To-Order (MTO) print enterprise. In an embodiment, the routing and scheduling of the plurality of print jobs may be performed by applying a MIP technique. The routing may be performed in such a manner that the processing cost and the transportation cost of the plurality of print jobs may be minimum. At each print shop in the MTO print enterprise, the scheduling may be performed in such a manner that capacity utilization of the print shop may be maximum and the processing time of the plurality of print jobs at the print shop may be minimum. The methods and systems for routing and scheduling as disclosed herein simplify the decisions that need to be taken at the routing server and at the application server in each of the print shops.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like. The claims can encompass embodiments for hardware and software, or a combination thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it may be intended that the present disclosure not be limited to the particular embodiment disclosed, but that the present disclosure will include all embodiments falling within the scope of the appended claims.

What is claimed is:

1. A method for generating a schedule to process a first set of print jobs at a print shop of a plurality of print shops, the method comprising:

transmitting, by one or more processors, a first capacity associated with the print shop to a routing server, wherein the first capacity is deterministic of a first number of print jobs that the print shop is capable of processing within a pre-defined period, wherein the routing server receives a request to process a plurality of print jobs within the pre-defined period, and wherein the plurality of print jobs comprises the first set of print jobs and a second set of print jobs;

receiving, by the one or more processors, the first set of print jobs routed by the routing server, wherein the first set of print jobs is to be processed within the pre-defined period based on the transmitted first capacity, wherein the routing of the first set of print jobs by the routing server is based on the received request, the transmitted first capacity, a first cost of routing the first set of print jobs to the plurality of print shops being less than a pre-defined threshold, and one or more first constraints, wherein the one or more first constraints comprise a distance between a point of origination of the first set of print jobs and each of the plurality of print shops;

determining, by the one or more processors, one or more second constraints associated with the print shop, wherein the one or more second constraints comprise:
a processing time, associated with processing the first set of print jobs, being less than an expected time to process the first set of print jobs,
a processing of a print job from the first set of print jobs after completion of a processing of another print job in the print shop, and
a second number of print jobs, being processed by each of one or more printers in the print shop at a time instance, is at most one;

transmitting, by the one or more processors, a feedback to the routing server, wherein the routing server identifies another print shop for re-routing a subset of the first set of print jobs that is unprocessed by the one or more printers in the print shop, wherein the identification of the another print shop is based on an updated first capacity determined using the feedback, and wherein the feedback is indicative of whether the print shop is capable of processing the first set of print jobs within the pre-defined period;

generating, by the one or more processors, the schedule to process the first set of print jobs, based on the one or more second constraints and the transmitted feedback, wherein the one or more second constraints minimize the expected time to process the first set of print jobs; and submitting, by the one or more processors, the unprocessed subset of the first set of print jobs to one or more printers in the another print shop and remaining of the first set of print jobs to each of the one or more printers in the print shop at one or more pre-defined time instants, wherein the one or more pre-defined time instants are determined based on the generated schedule.

2. The method of claim 1, further comprising displaying, by the one or more processors on a display screen, a visualization indicative of the schedule of processing the first set of print jobs.

3. The method of claim 1, wherein each of the first set of print jobs is processed by at most one printer of the one or more printers.

4. The method of claim 1, wherein the processing time of the first set of print jobs is determined based on a measure of a processing rate of the one or more printers and a start time of the processing of the first set of print jobs.

5. The method of claim 1, further comprising assigning, by the one or more processors, a first value to each of the first set of print jobs, wherein the first value is deterministic of whether the print job from the first set of print jobs precedes the another print job from the first set of print jobs.

6. The method of claim 1, further comprising assigning, by the one or more processors, a second value to each of the one or more printers for the print job, wherein the second value is deterministic of whether a printer from the one or more printers processes the print job.

7. The method of claim 1, further comprising transmitting, by the one or more processors, the updated first capacity to the routing server based on the feedback.

8. The method of claim 1, further comprising determining, by the one or more processors, a second capacity based on a count of the first set of print jobs and the first capacity, wherein the second capacity is indicative of a count of the second set of print jobs that the print shop is capable of processing in addition to the first set of print jobs.

9. The method of claim 8, further comprising receiving, by the one or more processors, the second set of print jobs for processing from the routing server.

10. The method of claim 1, wherein the schedule is generated based on one or more simulation techniques that comprise a Mixed Integer Programming (MIP) technique.

11. A method for routing a plurality of print jobs to a plurality of print shops, the method comprising:
   receiving, by one or more processors, a request to process the plurality of print jobs within a pre-defined period, wherein the plurality of print jobs comprises a first set of print jobs and a second set of print jobs;
   receiving, by the one or more processors, a first capacity from an application server associated with each of the plurality of print shops, wherein the first capacity is deterministic of a first number of print jobs that each of the plurality of print shops is capable of processing within the pre-defined period;
   routing, by the one or more processors, the first set of print jobs to the application server associated with each of the plurality of print shops based on the received request, the received first capacity, a first cost of routing the first set of print jobs to the plurality of print shops being less than a pre-defined threshold, and one or more first constraints that comprise a distance between a point of origination of the first set of print jobs and each of the plurality of print shops;
   receiving, by the one or more processors, a feedback from the application server associated with each of the plurality of print shops, wherein a routing server identifies another print shop of the plurality of print shops for re-routing a subset of the first set of print jobs that is unprocessed by one or more printers in a print shop of the plurality of print shops, wherein the identification of the another print shop is based on an updated first capacity determined using the received feedback, and wherein the feedback is indicative of whether each of the plurality of print shops is capable of processing the first set of print jobs within the pre-defined period;
   updating, by the one or more processors, the routing of the first set of print jobs based on the updated first capacity; and
   transmitting, by the one or more processors, the first set of print jobs to the application server associated with each of the plurality of print shops based on the updated routing of the first set of print jobs.

12. The method of claim 11, further comprising receiving, by the one or more processors, the updated first capacity from the application server associated with each of the plurality of print shops, wherein the receiving of the updated first capacity is based on the received feedback.

13. The method of claim 11, further comprising receiving, by the one or more processors, a second capacity from the application server associated with each of the plurality of print shops based on a count of the first set of print jobs and the first capacity, wherein the second capacity is indicative of a count of the second set of print jobs that each of the plurality of print shops is capable of processing in addition to the first set of print jobs.

14. The method of claim 13, further comprising routing, by the one or more processors, the second set of print jobs to the application server associated with each of the plurality of print shops based on the second capacity of each of the plurality of print shops.

15. The method of claim 11, wherein the one or more first constraints further comprise a second cost of transporting the first set of print jobs to each of the plurality of print shops and a third cost of processing the first set of print jobs at each of the plurality of print shops.

16. The method of claim 15, wherein the first cost is determined by computing a sum of the second cost and the third cost.

17. The method of claim 11, wherein each print job of the first set of print jobs is routed to at most one print shop.

18. The method of claim 11, wherein a schedule is generated for processing of the first set of print jobs by each of the plurality of print shops, wherein the generation of the schedule comprises determining, by the one or more processors, one or more second constraints associated with each of the plurality of print shops, wherein the one or more second constraints comprise:
   a processing time, associated with processing the first set of print jobs, being less than an expected time to process the first set of print jobs,
   a processing of a print job from the first set of print jobs after completion of a processing of another print job in the print shop, and
   a second number of print jobs, being processed by each of one or more printers in the print shop at a time instance, is at most one.

19. The method of claim 18, wherein the processing time of the print job is determined based on a size of each print job in the first set of print jobs and a processing rate of a printer of the one or more printers, wherein the size of each print job corresponds to a number of tasks performed to complete each print job in the first set of print jobs.

20. The method of claim 11, wherein the routing is performed based on one or more simulation techniques that comprise a Mixed Integer Programming (MIP) technique.

21. An application server to generate a schedule to process a first set of print jobs at a print shop of a plurality of print shops, the application server comprising:
   one or more processors configured to:
      transmit a first capacity associated with the print shop to a routing server, wherein the first capacity is deterministic of a first number of print jobs that the print shop is capable of processing within a pre-defined period, wherein the routing server receives a request to process a plurality of print jobs within the pre-defined period, and wherein the plurality of print jobs comprises the first set of print jobs and a second set of print jobs;

receive the first set of print jobs routed by the routing server, wherein the first set of print jobs is to be processed within the pre-defined period based on the transmitted first capacity, wherein the first set of print jobs is routed by the routing server based on the received request, the transmitted first capacity, a first cost to route the first set of print jobs to the plurality of print shops being less than a pre-defined threshold, and one or more first constraints, wherein the one or more first constraints comprise a distance between a point of origination of the first set of print jobs and each of the plurality of print shops;

determine one or more second constraints associated with the print shop, wherein the one or more second constraints comprise:
 a processing time, associated with processing the first set of print jobs, being less than an expected time to process the first set of print jobs,
 a process of a print job from the first set of print jobs after completion of a process of another print job in the print shop, and
 a second number of print jobs, being processed by each of one or more printers in the print shop at a time instance, is at most one;

transmit a feedback to the routing server, wherein the routing server identifies another print shop for re-routing a subset of the first set of print jobs that is unprocessed by the one or more printers in the print shop, wherein the identification of the another print shop is based on an updated first capacity determined using the feedback, and wherein the feedback is indicative of whether the print shop is capable of processing the first set of print jobs within the pre-defined period;

generate the schedule to process the first set of print jobs, based on the one or more second constraints and the transmitted feedback, wherein the one or more second constraints minimize the expected time to process the first set of print jobs;

display, on a display screen, a visualization indicative of the schedule of the process of the first set of print jobs; and submit the unprocessed subset of the first set of print jobs to one or more printers in the another print shop and remaining of the first set of print jobs to each of the one or more printers in the print shop at one or more pre-defined time instants, wherein the one or more pre-defined time instants are determined based on the generated schedule.

22. A routing server to route a plurality of print jobs to a plurality of print shops, the routing server comprising:
 one or more processors configured to:
  receive a request to process the plurality of print jobs within a pre-defined period, wherein the plurality of print jobs comprise a first set of print jobs and a second set print jobs;
  receive a first capacity from an application server associated with each of the plurality of print shops, wherein the first capacity is deterministic of a number of print jobs that each of the plurality of print shops is capable of processing within the pre-defined period;
  route the first set of print jobs from the plurality of print jobs to the application server associated with each of the plurality of print shops to the plurality of print shops based on the received request, the received first capacity, a first cost to route the first set of print jobs to the plurality of print shops being less than a pre-defined threshold, and one or more first constraints that comprise a distance between a point of origination of the first set of print jobs and each of the plurality of print shops;
  receive a feedback from the application server associated with each of the plurality of print shops, wherein the feedback is indicative of whether each of the plurality of print shops is capable of processing the first set of print jobs within the pre-defined period, wherein the routing server identifies another print shop of the plurality of print shops to re-route a subset of the first set of print jobs that is unprocessed by one or more printers in a print shop of the plurality of print shops, wherein the identification of the another print shop is based on an updated first capacity determined using the received feedback;
  update the route of the first set of print jobs based on the updated first capacity; and
  transmit the first set of print jobs to the application server associated with each of the plurality of print shops based on the updated route of the first set of print jobs.

23. The routing server of claim 22, wherein the one or more processors are further configured to receive a second capacity based on a count of the first set of print jobs, wherein the second capacity is indicative of a count of a second set of print jobs that each of the plurality of print shops is capable of processing in addition to the first set of print jobs.

24. The routing server of claim 23, wherein the one or more processors are further configured to route the second set of print jobs to the plurality of print shops based on the second capacity of each of the plurality of print shops.

25. A non-transitory computer-readable storage medium having stored thereon, a set of computer-executable instructions for causing a computer comprising one or more processors to execute operations, the operations comprising:
 transmitting, by the one or more processors, a first capacity associated with a print shop of a plurality of print shops to a routing server, wherein the first capacity is deterministic of a first number of print jobs that the print shop is capable of processing within a pre-defined period, wherein the routing server receives a request to process a plurality of print jobs within the pre-defined period, and wherein the plurality of print jobs comprises a first set of print jobs and a second set of print jobs;
 receiving, by the one or more processors, the first set of print jobs routed by the routing server, wherein the first set of print jobs is to be processed within the pre-defined period based on the transmitted first capacity,
 wherein the routing of the first set of print jobs by the routing server is based on the received request, the transmitted first capacity, a first cost of routing the first set of print jobs to the plurality of print shops being less than a pre-defined threshold, and one or more first constraints, wherein the one or more first constraints comprise a distance between a point of origination of the first set of print jobs and each of the plurality of print shops;

determining, by the one or more processors, one or more second constraints associated with the print shop, wherein the one or more second constraints comprise:
a processing time, associated with processing the first set of print jobs, being less than an expected time to process the first set of print jobs,
a processing of a print job from the first set of print jobs after completion of a processing of another print job in the print shop, and
a second number of print jobs, being processed by each of one or more printers in the print shop at a time instance, is at most one;

transmitting, by the one or more processors, a feedback to the routing server, wherein the routing server identifies another print shop for re-routing a subset of the first set of print jobs that is unprocessed by the one or more printers in the print shop, wherein the identification of the another print shop is based on an updated first capacity determined using the feedback, and wherein the feedback is indicative of whether the print shop is capable of processing the first set of print jobs within the pre-defined period;

generating, by the one or more processors, a schedule to process the first set of print jobs, based on the one or more second constraints and the transmitted feedback, wherein the one or more second constraints minimize the expected time to process the first set of print jobs; and submitting, by the one or more processors, the unprocessed subset of the first set of print jobs to one or more printers in the another print shop and remaining of the first set of print jobs to each of the one or more printers in the print shop at one or more pre-defined time instants, wherein the one or more pre-defined time instants are determined based on the generated schedule.

26. A non-transitory computer-readable storage medium having stored thereon, a set of computer-executable instructions for causing a computer comprising one or more processors to execute operations, the operations comprising:

receiving, by the one or more processors, a request to process a plurality of print jobs within a pre-defined period, wherein the plurality of print jobs comprises a first set of print jobs and a second set print jobs;

receiving, by the one or more processors, a first capacity from an application server associated with each of a plurality of print shops, wherein the first capacity is deterministic of a number of print jobs that each of the plurality of print shops is capable of processing within the pre-defined period;

routing, by the one or more processors, the first set of print jobs to the application server associated with each of the plurality of print shops based on the received request, the received first capacity, a first cost of routing the first set of print jobs to the plurality of print shops being less than a pre-defined threshold, and one or more first constraints that comprise a distance between a point of origination of the first set of print jobs and each of the plurality of print shops;

receiving, by the one or more processors, a feedback from the application server associated with each of the plurality of print shops, wherein a routing server identifies another print shop of the plurality of print shops for re-routing a subset of the first set of print jobs that is unprocessed by one or more printers in a print shop of the plurality of print shops, wherein the identification of the another print shop is based on an updated first capacity determined using the received feedback, and wherein the feedback is indicative of whether each of the plurality of print shops is capable of processing the first set of print jobs within the pre-defined period;

updating, by the one or more processors, the routing of the first set of print jobs based on the updated first capacity; and transmitting, by the one or more processors, the first set of print jobs to the application server associated with each of the plurality of print shops based on the updated routing of the first set of print jobs.

* * * * *